DATA HANDLING APPARATUS

Filed Dec. 12, 1962 4 Sheets-Sheet 1

INVENTOR.
THEODORE SAPINO

BY Fred Jacob

ATTORNEY

DATA HANDLING APPARATUS

Filed Dec. 12, 1962 4 Sheets-Sheet 2

INVENTOR.
THEODORE SAPINO
BY Fred Jacob
ATTORNEY

Nov. 22, 1966 T. SAPINO 3,287,698

DATA HANDLING APPARATUS

Filed Dec. 12, 1962 4 Sheets-Sheet 3

INVENTOR.
THEODORE SAPINO
BY
Fred Jacob
ATTORNEY

Nov. 22, 1966 T. SAPINO 3,287,698

DATA HANDLING APPARATUS

Filed Dec. 12, 1962 4 Sheets-Sheet 4

INVENTOR.
THEODORE SAPINO

BY Fred Jacob

ATTORNEY

United States Patent Office 3,287,698

Patented Nov. 22, 1966

3,287,698

DATA HANDLING APPARATUS

Theodore Sapino, Framingham, Mass., assignor to Honeywell Inc., a corporation of Delaware Filed Dec. 12, 1962, Ser. No. 244,060

20 Claims. (Cl. 340—146.1)

The present invention relates in general to new and improved data transfer apparatus, in particular to apparatus for verifying the selective transfer of data to a storage medium in accordance with digitally encoded input data.

Data output equipment associated with present-day binary digital computers must operate at very high speeds in order to transfer the output data, which is normally received in encoded form from the computer, to a more or less permanent storage medium. Depending on the nature of the storage medium, this data transfer may take the form of printing, card punching, magnetic recording or the like. The occurrence of errors could result in a disparity between the data received from the central processor and that transferred to the storage medium and hence constant checking is required to verify the correctness of the data at every step between the computer and the storage medium.

In Patent No. 3,240,920, of Charles J. Barbagallo and Richard D. Pascuito, entitled "Data Transmission Verifier," which is assigned to the assignee of the present application, a system for verifying the correctness of a data transfer between the central processor of a computer and a printed storage medium is disclosed. As pointed out in that patent, parity checking, which normally relies on the summation of a predetermined number of binary digits with a parity check digit that is carried in the data stream and a comparison of the aforesaid summation with a predetermined code, is not applicable to the final steps of selectively storing data characters in the output storage medium. Taking a line-at-a-time, high-speed printer as an example, it will be seen that the selection of a data character for storage in a desired position of the print line must culminate in an energizing signal for the appropriate print hammer which imprints the paper web with the desired data character. Such an energizing signal is not susceptible of parity checking. The aforesaid patent discloses a system for verifying the sequence of operations between the time the data appears at the output of the central processor of the computer and the time it is printed, to complement the normal parity check.

The system disclosed in the aforesaid patent makes use of a coincident current core memory for storing information derived from the central processor of a computer, as well as a buffer consisting of a plurality of flip-flops each capable of storing a print order corresponding to one of the data transfer devices. In addition, the system requires a pair of core planes for temporarily storing a duplicate of the sent information to the buffer for comparison later on with echoes produced upon printing. Such a system, although reliable in operation, is expensive to build. Quite apart from the additional pair of core planes required, the use of flip-flops in the buffer greatly increases the overall cost of the system. Not only are the individual flip-flop circuits themselves expensive, but they require special circuitry for addressing purposes to read data into and out therefrom.

It is the primary object of the present invention to provide apparatus for verifying the correct transfer of data to an output data storage medium in accordance with encoded input data receiped, which is relatively simple in construction and far less expensive than apparatus heretofore available.

It is a further object of the present invention to provide a core buffer in combination with a core memory in a data verifier adapted to be jointly addressed by coincident current selection, said buffer being additionally capable of effecting a simultaneous data readin or readout.

It is another object of the present invention to provide a coincident current core buffer in a data verifier which is further capable of effecting a linear data readin or readout.

It is an additional object of the present invention to provide a preamplifier for producing an accurately timed output response in a data verifier.

In the present invention the foregoing objects are carried out by providing a coincident current core memory having a plurality of locations, each capable of storing a coded input data character received from the central processor for subsequent transfer to a data storage medium. A buffer core plane is associated with the memory, each buffer core capable of being individually addressed jointly with a corresponding location of the memory. The core buffer is adapted to store data transfer orders responsive to a comparison of the coded input data characters in the memory with a first sequence of character codes. Further, echo data indicative of a data transfer is stored in the buffer. The coded input data is also compared with a second sequence of character codes, the results of the latter comparison being further compared with the echoes stored in the buffer to verify that a proper data transfer took place.

It is a feature of the present invention that the coercive force for switching the buffer cores is an integral multiple of the corresponding force required to switch the memory cores such that an integral turns ratio is maintained between the coincident current selection windings on the separate cores which permits the latter to be jointly addressed.

It is a further feature of the present invention that the preamplifiers which supply signals for application to the data transfer means, are directly coupled to special sense windings of the buffer cores. Thus, the simultaneous readout of the data transfer orders requires no sense amplifiers and a marked simplification over more conventional circuitry is effected. The aforesaid buffer sense windings are further employed to read echo signals simultaneously back into the buffer.

In accordance with an additional feature of the present invention the preamplifiers produce an accurately timed output response as determined by strobe signals originating in the buffer as well as upon the generation of the aforesaid character sequences.

These and other objects of the invention together with further features and advantages thereof will become apparent from the following detailed specification, with reference to the accompanying drawings in which.

Figure 1A:
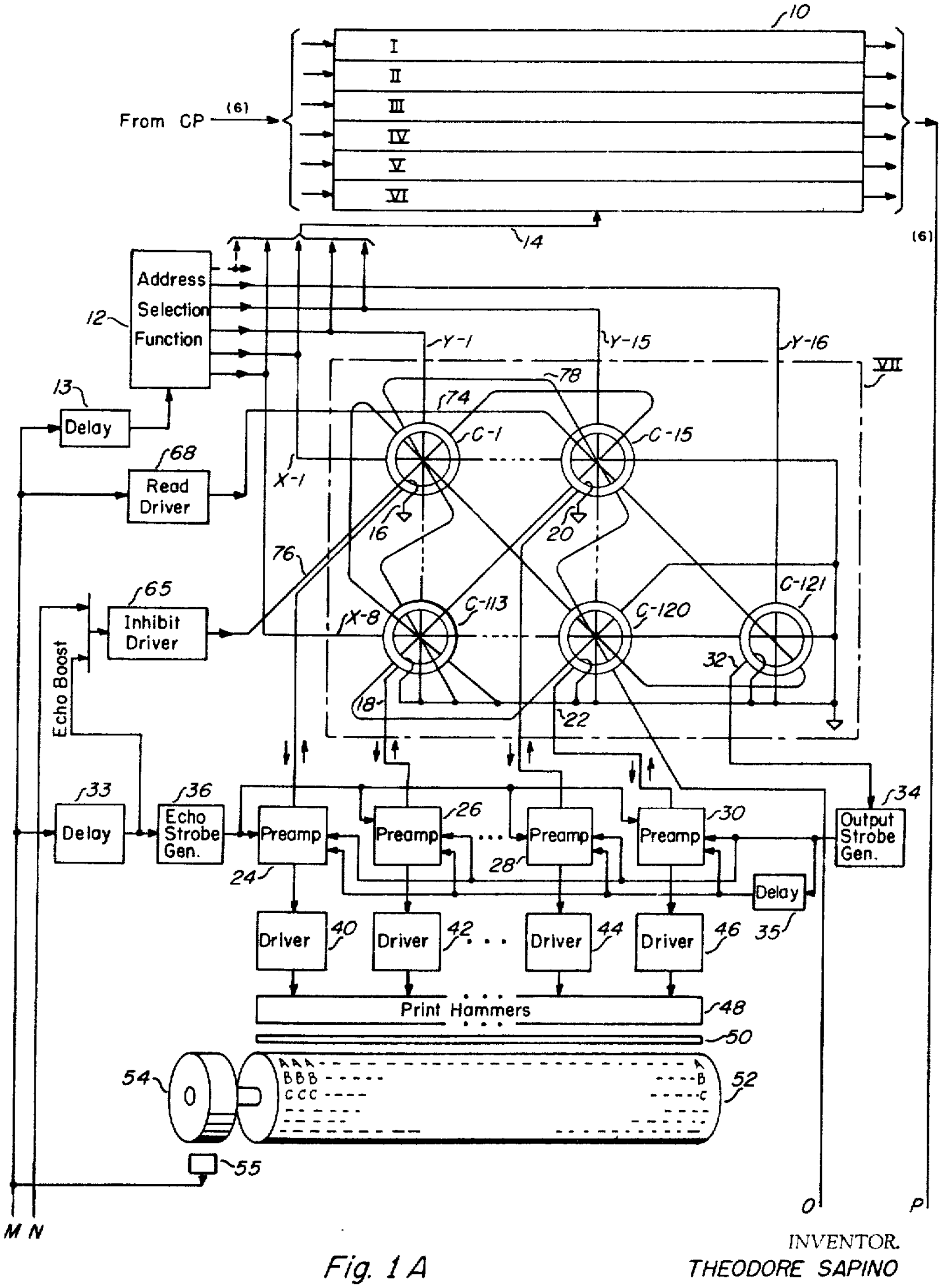
FIGURES 1A and 1B illustrate a preferred embodiment of the invention as applied to a "line-at-a-time" printer.
Figures 1B, 2:
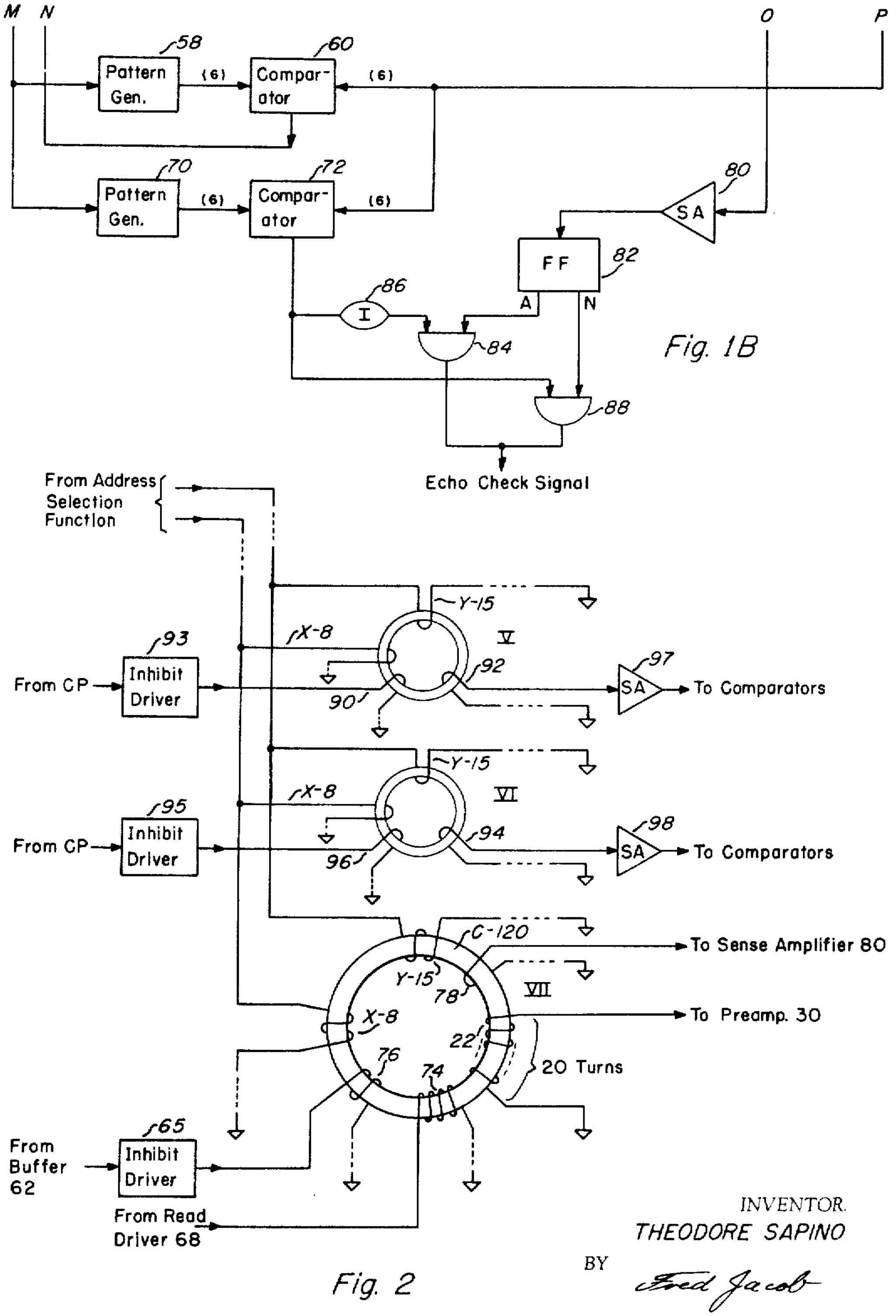
FIGURE 2 illustrates in greater detail the relationship of the memory and buffer cores in the embodiment of FIGURE 1 and their respective windings.

FIGURES 1A and 1B show reference designations M, N, O and P in both figures indicating corresponding connections. The memory 10 in FIGURE 1A is seen to contain six substantially identical core planes I–VI, each of which in the preferred embodiment of the invention, is assumed to have 120 bistable cores. The memory thus contains 120 different locations, each location including six corresponding cores of the respective core planes. These are connected so as to be jointly addressable by coincident current selection in a manner well known in the art.

A delay circuit 13 is connected to an address selection function unit 12. The latter is, in turn, connected to energize a set of coordinate row and column windings, as schematically indicated by the line 14 with respect to the memory 10. The address selection function unit essentially comprises read-write driver means, a counter and suitable decoding circuitry so connected that the column and row windings of successive cores of each core plane are energized in sequence. It will become clear from FIGURE 2 which is discussed hereinbelow that, in addition to the coordinate row and column windings for addressing individual cores, the memory will further include inhibit and sense winding means for data readin and readout respectively.

A buffer core plane VII contains a bistable storage core corresponding to each of the 120 locations of the memory 10. For the sake of clarity, only four of these buffer storage cores have been illustrated, to wit the cores C–1, C–15, C–113 and C–120. An additional core C–121 is separate from the remaining buffer cores and is used only for strobing purposes as will hereinafter be explained. The cores of the buffer VII are threaded by row and column windings labeled X and Y respectively, which are seen to be connected to the output of the address selection unit 12. Specifically, the cores C–1 and C–113 are threaded by the column winding Y–1, while the cores C–15 and C–120 are threaded by the column winding Y–15. The core C–121 is threaded by the column winding Y–16. The row winding X–1 threads the cores C–1 and C–15, while the row winding X–8 threads the cores C–113, C–120 and C–121. Each of the cores additionally contains an individual sense winding, such as the windings 16, 18, 20 and 22 which are connected to corresponding preamplifier circuits 24, 26, 28 and 30 respectively. It will be understood that the preamplifiers 24, 26, 28 and 30 are representative of 120 preamplifiers in the actual embodiment of the invention, each corresponding to one of said cores.

The core C–121 carries a sense winding 32 which is connected to an output strobe generator 34, the output of the latter being further connected to each of the 120 preamplifiers such as 24, 26, 28 and 30. A delay circuit 35 is connected between the output of the strobe generator 34 and each of the 120 preamplifiers. Similarly, an echo strobe generator 36, whose input is connected to a delay circuit 33, has its output connected to each of the 120 preamplifiers.

Each of the preamplifiers 24, 26, 28 and 30 is connected to a corresponding hammer driver circuit 40, 42, 44 and 46, the latter being again representative of 120 such actual circuits. Each driver circuit is connected to the solenoid of one of the 120 print hammers contained in the hammer module 48. The hammers confront a uniformly rotating print roll 52 through an intermediately positioned movable paper web 50. The print roll has 56 different lines of characters in the preferred embodiment, each line containing 120 identical characters. Thus a column of 56 different characters confronts each of the 120 print hammers as the print roll rotates at a uniform speed during the operation of the apparatus.

A character disc 54 is coupled to the print roll 52 to rotate in synchronism therewith and contains a plurality of marks spaced about its periphery, each mark corresponding to one of the 56 different character lines on the print roll. A sensing device 55 which may be a photoelectric cell, is positioned in close proximity to the character disc 54 to provide an output pulse upon the occurrence of each character mark on the disc 54.

As illustrated in FIGURE 1B, the output of the sensing device 55 is connected to a pattern generator 58 which may comprise a counter adapted to provide a different six-bit code at its output each time it is pulsed. As indicated by the numeral (6) the 6-line output of the pattern generator 58 is coupled to one input of a comparator 60, the other 6-line comparator input being connected to the output of the memory 10 in FIGURE 1A. The output of the comparator 60 is coupled to a buffer 62 illustrated in FIGURE 1A, which receives an additional input from the delay circuit 33.

The output of the sensing device 35 is further connected to the delay circuit 33, as well as to the delay circuit 13 and to a read driver circuit 68. The latter is adapted to provide a readout pulse in response to being energized by the sensing device. The output of the sensing device 55 is additionally connected to a pattern generator 70 which may be substantially identical to the pattern generator 58. The 6-line output of the pattern generator 70 is connected to one input of a comparator 72 which is substantially identical to the comparator 60. The other input of the comparator 72 being connected to the 6-line output of the memory 10.

The output of the read driver 68 is connected to a readout winding 74 which threads each of the cores of the buffer VII, including the strobe core C–121, before being grounded. The output of the buffer 62 is connected to a bidirectional inhibit driver 65 adapted to apply pulses to an inhibit winding 76 which threads each of the 120 storage cores of the buffer VII before being connected to ground. A sense winding 78 is similarly common to each of the 120 storage cores of the buffer VII and is connected between ground and a sense amplifier 80 in FIGURE 1B.

As shown in FIGURE 1B, the sense amplifier is further connected to a flip-flop 82 whose assertive output is coupled to one input of a 2-legged gate 84. The other gate input is connected to the output of an inverter 86 whose input is coupled to the output of the comparator 72. The latter output is further coupled to one input of a 2-legged gate 88 whose other input is connected to the negative output of the flip-flop 82. The outputs of the gates 84 and 88 are buffered together for further connection to a suitable warning device to provide an echo check signal.

FIGURE 2 shows a portion of a memory location, specifically the memory planes V and VI, and the buffer core which corresponds to that location. The memory location 120 is chosen for illustrative purposes, applicable reference numerals having been retained. In the preferred embodiment, the cores of the memory 10 consist of the same rectangular hysteresis core material as the buffer cores. Since it is desired to keep down the load requirements of the core drivers which supply the energizing pulses for switching the cores, the smallest possible cores are employed in the memory consistent with the output signal requirements. These output signal requirements are, in the case of the memory cores shown for the planes V and VI, determined by the characteristics of the sense amplifiers 97 and 98 respectively, whose inputs are respectively connected to the sense windings 92 and 94.

In the case of the buffer core plane, the output signal requirements are determined by the preamplifiers which are directly connected to the core winding without the use of intermediate sense amplifiers. Specifically, in the case of the buffer core C–120, the characteristic of the preamplifier 30 determines the amplitude of the signal which must be provided by the winding 22. The signal amplitude, in turn, depends on the flux in the core when the latter switches from one of its bistable stages to the other and on the number of turns of the winding 22 which must be relatively large. Thus, a larger core size than is used in the memory 10 is called for in the buffer.

In the illustrated preferred embodiment of the present invention an integral multiple of the memory core size is used for the buffer cores. Specifically a 2:1 ratio is employed so that twice the coercive force required to switch a memory core is necessary to switch a buffer core. The advantage of the integral core size ratio resides in the fact that the same X and Y drivers can be used for the main memory and for the buffer core plane merely by increasing the number of turns of the X and Y windings on the buffer cores. Thus, the windings X–8 and Y–15 in the core planes V and VI are seen to be single-turn windings. The corresponding windings X–8 and Y–15 in the buffer VII each have two turns. With double size buffer cores a 20-turn sense winding 22 is used to energize the preamplifier 30.

The X and Y windings of all the cores illustrated in FIGURE 2 are seen to be energized from the address selection function unit 12. As indicated schematically by the broken-line portion connecting ground, in each memory plane and in the buffer the winding X–8 links all the cores of the eighth row and the winding of Y–15 links all the cores of the fifteenth column. Similar connections exist in the remaining memory planes as indicated by the broken-line connection to the address selection unit. Information from a central processor is applied to an inhibit driver 93 which is connected to an inhibit winding 90, the latter being common to all the cores of the memory plane V, as indicated by the broken-line connection to ground. Similarly, an inhibit driver 95 is connected between the central processor and a common inhibit winding 96. It will be clear that each one of the X and Y windings is connected to apply a half-select current in a given direction to its particular core. The corresponding inhibit winding is adapted to apply a half-select inhibit pulse in the opposite direction so as to prevent the core from switching states upon command from the central processor.

In similar manner, the double-turn inhibit winding 76, upon being pulsed by the inhibit driver 65, applies a half-select pulse in a direction opposite to that applied by the corresponding pair of X and Y windings so as to selectively prevent core switching due to the energization of the latter windings. The winding 76 threads all the cores of the buffer VII with a double-turn winding, as indicated by the broken-line connection to ground.

As previously explained, the sense windings 92 and 94 of the core planes V and VI respectively, are connected to the inputs of the sense amplifiers 97 and 98 respectively. Each of these sense windings threads every core in its corresponding core plane, as indicated schematically by the broken-line connection to ground. In like manner, sense winding 78 in the buffer VII is common to every buffer core and is further connected to the aforesaid sense amplifier 80. By contrast, each buffer core has its own 20-turn sense winding, such as the windings 16, 18, 20 and 22, each being individual to its core. Each core is further linked by a readout winding 74 which is connected to the output of the read driver 68. This winding likewise threads every buffer core with a 4-turn winding, as indicated by the broken-line connection to ground, so as to be capable of switching said cores upon the application of a readout pulse from the read driver 68.

From the foregoing description it will be clear that the integral multiple relationship between the size of the memory cores and of the buffer cores, and consequently between their respective X and Y windings, permits the X and Y windings of the buffer cores to be pulsed directly from the address selection unit whose signals are also applied to the main memory cores. Further savings can be effected if it is desired to use the same standard inhibit driver for the buffer as is used for each of the main memory core planes. In the latter case, the inhibit driver 65 may be replaced by a pair of inhibit drivers such as 93 or 95, the output of each of which is applied to a single-turn inhibit winding which is substituted for the double-turn winding 76. Similarly, the read driver 68 may be replaced by four separate standard driver circuits, each being connected to a single-turn winding on each buffer core in substitution for the 4-turn inhibit winding 74.

The operation of the apparatus of FIGURE 1 will now be explained with further reference to the timing diagram of FIGURE 3. The print roll 52 rotates at uniform speed together with the character disc 54. Accordingly, the photosensitive device 55 produces periodic character pulses. The character pulses D to G have been illustrated in FIGURE 3A of the drawing. A character cycle may be defined as the time interval between successive character pulses during which time all 120 core locations are addressed by pulses applied by the address selection unit 12.

As explained in connection with the aforesaid copending application Serial Number 113,351, a memory or address cycle may be defined as that interval of time during which the data in one core location is read out and data is read back into the same location. In the case of the memory, the data character code stored in a given core location, having once been received from the central processor where it originated, is read out and read back into the same location during each memory cycle. In conventional manner, the readout of each core of a given memory location is carried out by means of the sense winding, e.g. the windings 92 and 94 in FIGURE 2, common to the core plane, by pulsing the coordinate X and Y windings with half-select pulses of the same polarity. A readin is effected by pulsing the X and Y windings with half-select pulses of the opposite polarity, an inhibit pulse being simultaneously applied, or not applied, in accordance with the information that is to be read into the core.

Let it be assumed that at time $d_0$ the sensing device 55 has sensed the mark on the character disc 54 which corresponds to the character D on the print roll 52 that will subsequently move into printing position. The resultant character pulse is applied to the pattern generator 58 to cause the latter to count to the next number. In the example chosen, this corresponds to the six-bit code for the character D which is applied to the comparator 60. See FIGURE 3B. The character pulse is further applied to the pattern generator 70 which counts through the same six-bit code sequence, but which lags the pattern generator 58 by two character codes equivalent to two characters on the print roll 52. Accordingly, as shown in FIGURE 3D, the six-bit code for the character B appears at the output of the pattern generator 70 and is applied to the comparator 72. The character pulse which occurs at time $d_0$ is further applied to the read driver 68 which responds by pulsing the common buffer readout winding 74 to read out simultaneously the contents of all the buffer cores. As shown in FIGURE 3F, at time $d_0$ print orders with respect to the preceding character C are read out of the buffer.

It will be undestood that under proper operating conditions only a single character is printed in the same space of a print line. Since each of the cores C–1 to C–120 of the buffer core plane VII corresponds to one space of the print line, those buffer cores whose print orders for the character C are read out to the preamplifiers at time $d_0$ will not receive print orders again until a revolution of the print roll 52 has been completed and the next line is printed.

Let is be assumed that in a given print line the character B is to be printed in the first space and the character C is to be printed in the fifteenth space in accordance with appropriate character codes stored in the corresponding locations of the memory 10. Only the core C–15 and the strobe core C–121 will be in the set state when the read driver 68 pulses the readout winding 74 in response to the application of the D character pulse, to reset these cores simultaneously. Accordingly, an output pulse indicative of a print order appears across the sense winding 20 of the core C–15 which is applied to the preamplifier 28. Since only the preamplifier 28 receives an input signal from the buffer at this time, it alone will become active to energize a print hammer and to produce a C echo pulse, as explained below. A signal will also appear arcoss the sense winding 32 of the strobe core C–121, which is applied to the output strobe generator 34. The latter, in turn, provides a strobe pulse which is applied through a gating structure to all 120 preamplifiers. The function of the strobe pulse will be explained in greater detail below.

Since the character B is to be printed in the first space of the print line, a print order must have been previously read out from the core C–1 to the preamplifier 24 for that character. At time $d_0$ the preamplifier 24 is generating a B echo signal indicative of the previous transfer of a B print order to the preamplifier 24. See FIGURE 3H. The D character pulse is further applied to the delay circuit 33 which provides an output pulse in response thereto at time $d_1$. The latter pulse is simultaneously applied to the echo strobe generator 36 and to the bidirectional inhibit driver 65 by way of a buffer. The resultant echo strobe pulse provided by the unit 36 is shown in FIGURE 3J and is simultaneously applied to all 120 preamplifiers at time $d_1$. Since an echo signal (in this case one representative of the character B) is generated only by the preamplifier 24, an echo signal is read only into the core C–1 by way of its individual sense winding 16. Although the latter is a 20-turn winding, the echo signal applied to the core C–1 is too weak by itself to switch the core. However, the inhibit driver 65 simultaneously applies a half-select boost pulse in the same direction to the inhibit winding 76 which is common to all the cores of the buffer. The total energization applied to the core C–1 by the sense winding 16 and by the inhibit winding 76 is sufficient to switch the core to the set state indicative, at this time, of a B echo.

The D character pulse is further applied to the delay circuit 13 whence it produces an output pulse at time $d_3$. The latter pulse is effective to initiate the addressing operation of successive memory locations jointly with their corresponding buffer cores. During each memory address cycle a single memory location is addressed by coincident current selection. Data is first read out from that location and is subsequently read back in during the same memory cycle. Similarly, coincident current selection is used to address the corresponding buffer core. In the case of the buffer core, however, the data read into the core during the readin phase of the memory cycle is not of the same kind as that read out during the readout phase.

As the six-bit character codes of the various memory locations appear at the memory output during successive memory cycles, they are simultaneously applied to the comparators 60 and 72. As will be seen from FIGURES 3C and 3E, this process occurs between $d_3$ and $d_5$.

From FIGURE 3B it appears that the comparator 60 has the code for the character D applied to its other input during the interval $d_0$–$d_6$ which brackets the above time interval. Thus, each of the memory locations is examined for the presence of the character D. Let it be assumed that the code for the character D is stored in memory locations 113 and 120 indicative of the fact that a D is to be printed in the 113th and 120th spaces of the aforesaid print line. Prior to the 113th memory cycle, the application of inhibit pulses from the bidirection inhibit driver 65 to the winding 76 will prevent the readin of data to the buffer cores. When the memory location 113 is read out during the initially occurring readout phase of the 113th memory cycle, a true comparison will be obtained between the character code stored there and the character code generated by the pattern generator 58. As a consequence, a true comparison signal is applied to the inhibit driver 65 which, in turn, will fail to apply an inhibit pulse to the winding 76 during the subsequent readin phase of the 113th memory cycle. The failure of the inhibit winding 76 to be pulsed when the buffer core C–113 is being addressed, i.e. when the Y–1 and X–8 select lines are active, will cause that core to be set indicative of a print order. In similar manner, a print order is stored in the buffer core 120 during the 120th memory cycle so that two buffer cores will contain print orders for the character D at time $d_5$. During the 121st memory cycle the buffer core C–121, which has no inhibit winding, is unconditionally set.

As will become clear with reference to FIGURE 4 below, a predetermined time interval must elapse between the time a print order signal is read into a preamplifier from the 20-turn sense winding of the corresponding buffer core and the time a corresponding echo signal is generated by the preamplifier. As previously explained, at time $d_0$ the readout pulse applied to the winding 74 resets the cores C–15 and C–121, the latter core producing a timing pulse across the sense winding 32. This is coupled to the output strobe generator 34 to apply a strobe pulse to an input gating structure of each preamplifier, as shown in FIGURE 3G, which lets the preamplifier discriminate against spurious noise signals that may appear across the sense windings of the buffer cores. Simultaneously, a print order signal is applied to the aforesaid gating structure of the preamplifier 28 from the sense winding 20 of the core C–15. The coincidence of these two signals renders the preamplifier 28 active. However, no output signal or echo signal is produced until time $d_2$ due to the inherent delay of the preamplifier 28. This delay prevents the echo strobe pulse which is applied to all 120 preamplifiers at time $d_1$, from reading a C echo back into core C–15 at that time. Hence, at time $d_1$ only a B echo is read back into the core C–1. At time $d_4$ the delay circuit 35, which previously received an output signal from the strobe generator 34, applies a corresponding strobe turn-off signal to all 120 preamplifiers. As will become clear with reference to FIGURE 4 below, the first strobe turn-off pulse so applied to a preamplifier is ineffective to terminate its echo signal. Accordingly, only the B echo signal which is generated by the preamplifier 24 is terminated at time $d_4$. The C echo signal will not be terminated until time $e_4$ in the subsequent character cycle.

As previously explained, the pattern generator 72 lags the pattern generator 60 by two character codes. Thus, during the period starting at time $d_3$ and ending at time $d_5$ when the comparator 60 is looking for the character D, the comparator 72 will be looking for the character B while the same memory locations are being examined. As seen from FIGURE 3D, the B code is applied to the latter comparator from $d_0$–$d_6$ which brackets the interval $d_3$–$d_5$. In accordance with the previously chosen example, when the first location of the memory 10 is examined the six-bit code for the character B is read out. Upon being compared with the output of the pattern generator 70 by the comparator 72, a true comparison output pulse is obtained which is applied to the inverter 86 and to one leg of the gate 84.

Figure 3:
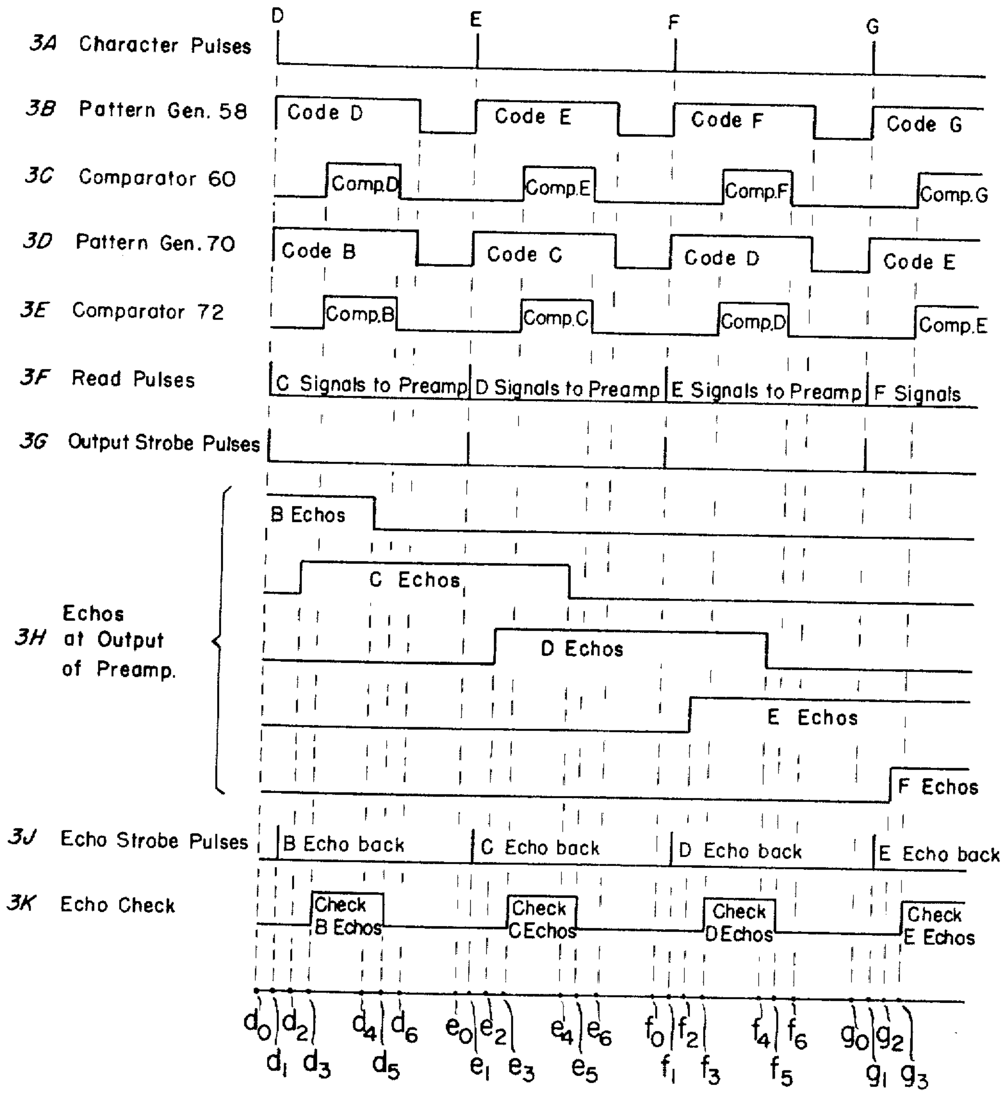
FIGURE 3 is a timing diagram of the pertinent signals which occur in the operation of the apparatus of FIGURE 1.

As will be seen from FIGURE 3, when the comparison portion of the character cycle is initiated at time $d_3$, the only data stored in the cores of the buffer are B echos. In the specific example under consideration, a B echo is stored only in the core C–1. Since each buffer storage core is jointly addressed with its corresponding memory location by coincident current core selection during the period $d_3$–$d_5$, it will first be read out before data is read into it in each memory cycle. Thus, when the buffer core C–1 is individually read out by coincident current selection, a pulse will appear on the common sense winding 78 which is amplified by the sense amplifier 80 and is subsequently applied to the flip-flop circuit 82 to cause its assertive output to be active. Since the presence of a true comparison pulse at the output of the comparator 72 means that there will be no pulse at the output of the logical inverter 86, the gate 84 will be inactive and will not provide an output signal. Conversely, one input leg of the gate 88 which is directly connected to the output of the comparator 72 will be active. The gate will not be active, however, since the negative output of the flip-flop 82 will be inactive. As a consequence, no echo check signal, which would be indicative of a print error, is generated.

The converse situation will obtain upon reading out the remaining cores of the buffer jointly with their corresponding memory locations. Since only the core C–1 stores an echo between times $d_3$ and $d_5$ in the assumed example, the read out of all other buffer cores by coincident current selection will fail to produce an output pulse on the common sense winding 78. Thus, the negative output of the flip-flop 82 will be active. By the same token, if no errors exist, no true comparisons will be obtained by the comparator 72 subsequent to memory location 1. Thus, the output of the inverter 86 will be active to pulse one leg of the gate 84, while the other leg remains inactive. Hence the gate 84 will not conduct. In the case of the gate 88, only the leg which is connected to the negative output of the flip-flop 82 will be active while the other leg will be inactive. Hence, the gate 88 will remain closed and no echo check signal is obtained. As shown in FIGURE 3K, the echo checking operation is carried out between $d_3$ and $d_5$ concurrently with the comparison portion of the character cycle.

The process set forth above is substantially repeated during the next character cycle which is initiated with the arrival of the E character pulse at time $e_0$. Thus, at time $e_0$ the print orders for the character D in the buffer cores C–113 and C–120 are simultaneously read out by linear core selection to the corresponding print amplifiers 26 and 30 respectively. At time $e_1$, the C echo signal from the preamplifier 28 is read into the core C–15. (If there are any other C echoes, they are simultaneously read into the appropriate buffer core by linear core selection.)

Between $e_3$ and $e_5$ the 120 memory locations are successively addressed by coincident current selection during 120 memory address cycles, simultaneously with the corresponding buffer cores. During the readout phase of the 15th memory cycle, the C echo stored in the core C–15 is read out for echo checking as explained above. Print orders for the character E, if any, are stored in the buffer cores during the readin phase of the appropriate memory cycles. It will be understood that no such readin of E print orders will occur with respect to the cores C–1, C–15, C–113 or C–120. The simultaneous readin of D echoes to the cores 113 and 120 does not occur until the next character cycle which is initiated at time $f_0$. During the latter character cycle these cores are read out by coincident current selection to effect the echo check.

Figure 4:
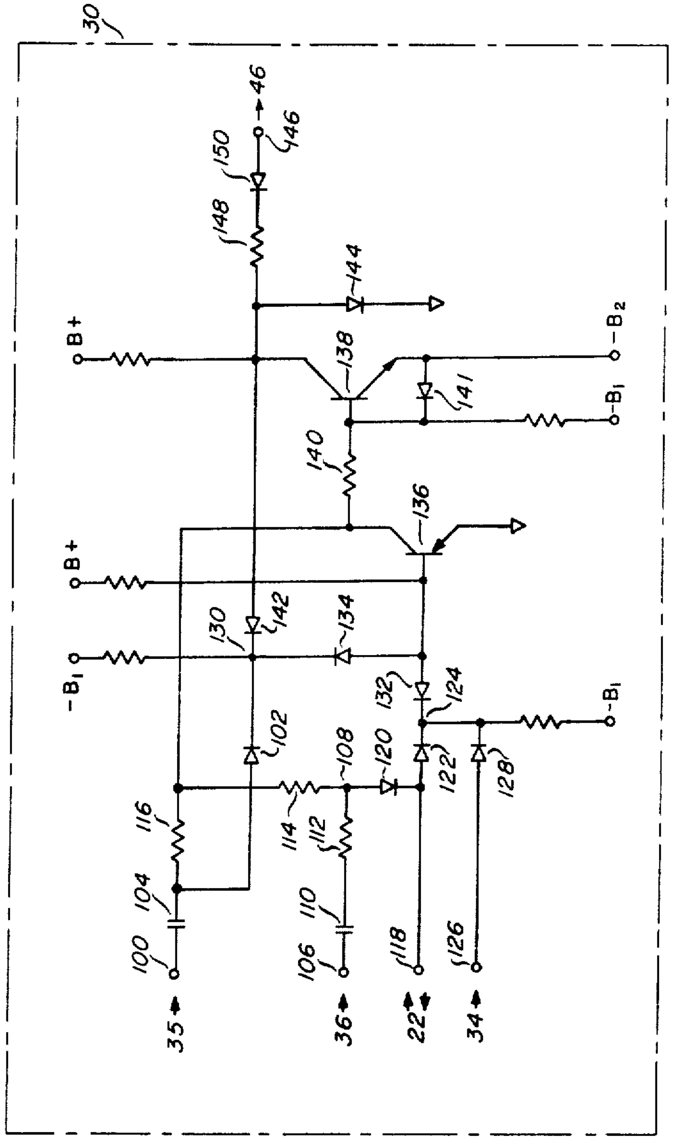
FIGURE 4 illustrates a preferred embodiment of a preamplifier used in the apparatus of FIGURE 1.

FIGURE 4 illustrates a preferred embodiment of a preamplifier circuit which may be used in the apparatus of FIGURE 1. The circuit shown constitutes an improvement over a control circuit disclosed in a copending application of Theodore Sapino and Alan J. Deerfield entitled "Print Hammer Driver Circuit," Serial Number 155,343, filed November 28, 1961, which is assigned to the assignee of the present application. The reference numerals applicable to the preamplifier 30 have been used. As indicated in the drawing, the delay circuit 35 is connected to the terminal 100 which is coupled to a diode 102 by way of a capacitor 104. The strobe generator 36 of FIGURE 1 is connected to a terminal 106 which is coupled to a junction point 108 by way of a capacitor 110 and resistor 112. A resistor 114 couples the junction point 108 to a further resistor 116 whose other terminal is connected to the capacitor 104. The sense winding 22 of the core C–120 is connected to a terminal 118 in FIGURE 4, the latter being coupled to the junction point 108 by way of a diode 120 which has its anode connected to the latter point.

A diode 122 has its anode connected to the terminal 118 and its cathode connected to a junction point 124. The output strobe generator 34 of FIGURE 1 is connected to a terminal 126 in FIGURE 4, the latter being coupled to the aforesaid junction point 124 by way of the cathode of a diode 128. A source of negative D.C. potential $-B_1$ is resistively coupled to the junction point 124. The cathode of the diode 102 is connected to a junction point 130 which is resistively coupled to the aforesaid D.C. source $-B_1$. A diode 132 has its cathode connected to the junction point 124, while the anode is coupled to the base of a PNP transistor 136. A diode 134 has its cathode connected to the junction point 130 and its anode connected to the aforesaid transistor base which is resistively coupled to a source of positive D.C. potential B+. The emitter of the transistor 136 is grounded and its collector is connected to the junction point of the resistors 114 and 116.

The collector of transistor 136 is further coupled to the base of an NPN transistor 138 by way of a resistor 140. The latter transistor base is resistively coupled to the aforesaid source $-B_1$. The emitter of the transistor 138 is connected to a second source of a negative D.C. potential $-B_2$, as well as being coupled to its own base by means of a diode 141. The collector of the transistor 138 is resistively coupled to the aforesaid D.C. source B+ and is further connected to the anode of a diode 142 whose cathode is connected to the junction point 130. The collector is further coupled to ground by a diode 144, as well as being coupled to an output terminal 146 by way of a resistor 148 and a diode 150. The output terminal 146 is connected to the print hammer driver 46 which is shown in FIGURE 1.

In operation, both transistors 136 and 138 of the two-stage preamplifier 30 are normally cut-off. The action of the preamplifier is initiated by the coincidence of signals on the terminals 118 and 126, i.e. by a signal derived from the 20-turn sense winding of the core C–120 and the simultaneously occurring output strobe generator pulse. These signals are applied to a two-legged AND gate whose input legs consist of the diodes 122 and 128. The diode 132 then becomes conductive and, because of the low resistance coupling to the source $-B_1$, the transistor 136 is driven to saturation.

Since the collector of the transistor 136 is coupled to the base of the transistor 138 by way of a relatively low resistance 140, the latter transistor is similarly driven to saturation. This causes the collector of transistor 138, which was formerly clamped to ground through the diode 144, to fall to a level approximating that of the source $-B_2$. Because of the regenerative coupling from the collector of transistor 138 to the base of transistor 136, such action occurs rapidly. The low voltage on the collector of the transistor 138 causes the diode 142 to be cut-off. There is now a current flow between the source $-B_1$ and the base of the transistor 136 which will keep the transistor 136 saturated after the input signals have terminated.

The circuit will remain in that condition, i.e. in the "on" condition, until a turn-off strobe pulse is applied to the terminal 100 from the delay circuit 35. This turn-off pulse is applied to the circuit through the capacitor 104 and constitutes a positive-going pulse. The capacitor 104, which initially had a negative charge on it with a potential equivalent to that of the source $-B_1$, discharges through the resistor 116 when the transistor 136 is first saturated. The time constant of capacitor 104 and resistor 116 is chosen such that the voltage at the junction point of these two components is equal to or greater than the voltage of the turn-off strobe pulse, at the time when the first turn-off strobe pulse is applied to the capacitor 104 after the preamplifier becomes active.

This action causes the diode 102 to remain backbiased when the first turn-off strobe pulse is applied. When the second turn-off strobe pulse is applied, however, the condenser 104 will be sufficiently discharged so that now the diode 102 becomes forward biased to establish a current flow to the $-B_1$ source. This action, in turn, cuts-off the diode 134 which is further effective to render the transistor 136, and hence the transistor 138, nonconductive. The condenser 104 now recharges through the resistors 116 and 140 so that the circuit is again capable of being operated during the next character cycle.

When the transistor 138 is in its saturated state, current is supplied to the print hammer driver 46 through the resistor 148 and the diode 150. The latter diode prevents a negative-going noise current and voltage from back-triggering the preamplifier 30. Once the preamplifier is turned on in response to the coincident application of signals to the terminals 118 and 126 at time $d_0$, the diode 120 will become forward biased at time $d_2$. The delay interval is therefore $d_0$–$d_2$. When the echo strobe generator applies an echo strobe pulse to the terminal 106, the capacitor 110 is in its charged state at the approximate potential of $-B_1$. The application of the echo strobe pulse will discharge the condenser 110 sufficiently so that current is coupled to the terminal 118 for application to the 20-turn sense winding of the buffer core C–120. The latter, in conjunction with the simultaneously applied echo boost signal, will then be switched. It will be noted that the turn-on of the preamplifier 30, in response to an input signal coincidentally applied with a strobing signal, must always occur before the diode 120 can become conductive at the end of the aforesaid delay interval. Failing such turn-on at the preamplifier, the diode 120 will remain backbiased and no echo signal will be fed to the core sense winding when an echo strobe pulse is applied.

It will be clear that the above-described preferred embodiment of the present invention is susceptible of numerous variations and modifications. As pointed out in connection with FIGURE 2, each multiple-turn winding may be replaced by a number of single-turn windings. Such an arrangement may be preferable where a standard core driver is to be connected to each of these single-turn windings. The strobe core arrangement disclosed is not required if proper noise discrimination is provided. Alternatively, more than one strobe core may be employed where it is desired to increase the strength of the signal which is applied to the output strobe generator. The coordinate X and Y windings need not necessarily be physically identical for the memory 10 and the buffer core plane VII, provided only that they are electrically identical so that the cores of a memory location and the corresponding buffer core are simultaneously addressed.

The preamplifiers may take a different form from that described in connection with FIGURE 4, particularly where greater time variations can be tolerated. Where the output strobe generator arrangement is dispensed with, a one-shot multivibrator may be employed. The coercive force ratio of 2 to 1 between the buffer and memory cores is intended to be illustrative and not limiting. Such a ratio is preferably, however, an integral multiple so that the windings of the respective cores may similarly be multiples of each other. The circuit illustrated for comparing the output of the comparator 72 with the output of the sense amplifier 80 is illustrative only and other logical circuits may be employed to carry out the equivalent logical function.

With the apparatus described and illustrated herein, a vital checking function is carried out in a data transfer system wherein the customary parity check would be inadequate by itself to verify that a particular character has been properly transferred in accordance with the input data received. By employing a separate core plane as a buffer between the memory which stores data and the actual data transfer apparatus, a degree of simplicity and economy is obtained which was heretofore impossible. Thus, the core buffer combines in a single device the capability of being addressed by coincident current selection, to have print data stored in the respective cores and echoes read out therefrom, and the capability of having print orders linearly read out therefrom and echoes read in in the same manner.

The present invention is not limited to printer applications but finds utility with any system wherein the input data codes are translated into actuating signals for the data transfer apparatus which effects the actual storage of the data characters in the data output storage medium.

From the foregoing disclosure of the invention, it will be apparent that numerous modifications, changes and equivalents will now occur to those skilled in the art, all of which fall within the true spirit and scope contemplated by the invention.

What is claimed is:

1. Apparatus for verifying the selective storage of data characters in a data storage medium in accordance with coded input data composed from a predetermined set of different characters, comprising a coincident current core memory having a plurality of different locations for storing said coded input data characters, a coincident current core buffer having a core corresponding to each of said memory locations, means for successively addressing said memory locations jointly with their corresponding buffer cores, means successively operative for storing in said buffer cores true comparisons between said coded input data characters and the codes of an independently generated first sequence of said predetermined set of characters, data transfer means adapted to store characters in said data storage medium, means for simultaneously reading the true comparison contents of said buffer cores into said data transfer means, means responsive to the readout of said true comparisons from said buffer cores for simultaneously reading corresponding echoes into the same buffer cores, means for successively comparing said coded input data characters and the character codes of an independently generated second character sequence substantially identical to said first sequence and lagging the latter, and means for comparing the results of said last-recited comparison with said echoes.

2. In combination, a bistable core memory having a plurality of different locations respectively adapted to store input data characters, a bistable core buffer having a core corresponding to each of said different memory locations, coincident current means for successively addressing all of said different memory locations simultaneously with their corresponding buffer cores during a corresponding succession of address cycles, means for generating a pair of substantially identical sequences of different data characters out of phase with each other during a corresponding succession of character cycles, each of said character cycles including said succession of address cycles, means active during each address cycle for comparing the input data character of the memory location read out during said address cycle with the simultaneously generated pair of sequence characters, means responsive to the comparison with the leading sequence character then generated for storing operating data during the same address cycle in the buffer core corresponding to said read out memory location, means operative during the next character cycle for simultaneously reading out the operating data contents of all of said buffer cores, means responsive to said simultaneous buffer readout for simultaneously reading corresponding echo data into said buffer cores, means operative during each address cycle of the subsequent character cycle for reading out said echo data from the then addressed buffer core prior to reading operating data into said core during the same address cycle, and means for comparing the echo data contents read out from said buffer core with the comparison results obtained during the same address cycle between said memory location contents and the lagging sequence character then generated.

3. In combination, a bistable core memory having a plurality of different locations adapted to store input data, a bistable core buffer having a core corresponding to each of said different memory locations, coincident current means for successively addressing said different memory locations jointly with their corresponding buffer cores during a corresponding succession of address cycles, each address cycle including a readout and a readin phase, means active during each address cycle for operating on the input data contents of the memory location read out during said address cycle, means responsive to said last-recited operation for storing operating data during the same address cycle in the buffer core corresponding to said read out memory location, means operative upon the termination of said succession of address cycles for simultaneously reading out the operating data contents of all of said buffer cores, means responsive to said simultaneous buffer readout for simultaneously reading corresponding echo data into said buffer cores, and means operative during each one of a subsequent succession of address cycles for reading out the echo data contents of the addressed buffer core prior to the reading of operating data into said core during the same address cycle.

4. Apparatus for verifying the selective storage of data characters in a data storage medium in accordance with input data composed from a predetermined set of different characters, comprising means for successively determining true comparisons between said input data and an independently generated first sequence of said predetermined set of characters, means for storing respective ones of said true comparisons in individual storage locations, means energized in accordance with said stored true comparisons to store corresponding data characters in said medium, means responsive to said last-recited energization for generating corresponding echoes, means for storing each of said echoes in the same storage location as its corresponding true comparison, means for successively comparing said input data with an independently generated second sequence of characters substantially identical with said first sequence and lagging the latter, and means for comparing the results of said last-recited comparison with said stored echoes.

5. A magnetic storage device comprising a coordinate array of bistable cores, said array being organized into rows and columns respectively each including at least a pair of cores, means including coordinate row and column windings for addressing individually selected ones of said cores, means including a sense winding common to said cores for reading out the contents of said individually addressed cores, means including an inhibit winding common to said cores for reading data into said individually addressed cores, a sense winding individual to each of said cores, means including a readout winding common to said cores for simultaneously reading out the contents of all of said cores through said individual sense windings, means for concurrently activating said inhibit windings and selected ones of said individual sense windings for simultaneously reading data into said cores.

6. A control circuit comprising transistor means having an input and an output, first and second terminals coupled to said input, means for applying input signals to said first terminal, means for periodically applying first strobing signals to said second terminal, means responsive to the coincidence of said input signals and said first strobing signals to provide an output signal at said output, a third terminal coupled to said transistor means through a delay circuit, means for periodically applying turn-off signals to said third terminal, the time constant of said delay circuit being adapted to render ineffective the first-applied turn-off signal following the coincidence of said input signal and said first strobing signal, a fourth terminal, diode means coupling said first and fourth terminals and being adapted to become conductive in response to the coincident application of said input signals and said first strobing signals, means for periodically applying second strobing signals to said fourth terminal, and means responsive to said second strobing signals to derive echo signals at said first terminal when said diode means is conductive.

7. A control circuit comprising, a data terminal for applying input signals, means for strobing said input signals to said circuit to initiate a predetermined circuit state, means for periodically applying turn-off signals to said circuit adapted to terminate said circuit state, said last-recited means inlcuding means for rendering ineffective the first-applied turn-off pulse following the initiation of said circuit state, means for periodically applying echo strobing signals to said circuit, and means dependent on said predetermined circuit state for deriving echo signals at said first terminal in response to said echo strobing signals.

8. A control circuit comprising first and second transistors each having their emitters coupled to a reference potential, the collector of said first transistor being coupled to the base of said second transistor, means for deriving an output signal at the collector of said second transistor, first and second terminals gated to the base of said first transistor adapted to receive input signals and periodic first strobing signals respectively, a third terminal adapted to receive periodic turn-off signals, and RC circuit coupling said third terminal to the collector of said first transistor and having a time constant adapted to render ineffective the first-applied turn-off pulse following the simultaneous occurrence of said input signals and said first strobing signals, a first junction point resistively coupled to a reference potential, first, second and third diode means respectively coupling said first junction point to said RC circuit, to the base of said first transistor and to the collector of said second transistor, a fourth terminal coupled to a second junction point and adapted to receive periodic second strobing signals, said second junction point being resistively coupled to said RC circuit, and fourth diode means for coupling said first and fourth terminals to derive echo signals at said fourth terminal.

9. In combination, a multi-plane coincident current core memory having a plurality of different locations respectively adapted to store input data character codes, each of said locations including one core from each memory plane, each core of said location including coordinate X and Y windings connected to permit said location to be addressed, each of said memory planes including an inhibit winding and a sense winding respectively linking each core of said plane, a coincident core buffer including a separate core corresponding to each of said memory locations, each of said buffer cores being linked by coordinate X and Y windings, means for successively addressing said memory locations together with the corresponding buffer cores by jointly energizing the coordinate windings of each, said plurality of buffer cores being linked in common by a readout winding, an inhibit winding and a sense winding respectively, each buffer core further including a sense winding individual thereto, means for generating a sequence of said character codes, means including said memory sense windings for comparing the contents of said successively addressed memory locations with each generated character code, means responsive to each true comparison obtained for energizing said buffer inhibit winding to store a data transfer order in the simultaneously addressed buffer core, means for energizing said buffer readout winding for simultaneously reading out all of said data transfer orders through said individual buffer core sense windings, means connected to each of said last-recited sense windings and responsive to said data transfer orders for simultaneously transferring corresponding data characters to a storage medium, said last-recited means being further responsive to said data transfer orders to generate corresponding echoes, means for simultaneously reading said echoes into said buffer cores through said individual buffer sense windings, and means for reading said echoes out of said successively addressed buffer cores through said common buffer sense winding.

10. In combination, a coincident current core memory having a plurality of different locations, means including coordinate memory core windings for successively addressing said locations, means including memory inhibit and sense windings for reading data into and out from respectively said addressed memory locations, a coincident current core buffer having a core corresponding to each of said memory locations, means including coordinate buffer core windings for addressing said buffer cores simultaneously with their corresponding memory locations, means including a buffer inhibit winding common to all of said buffer cores for reading data into said successively addressed buffer cores, means including a buffer sense winding common to all of said buffer cores for reading data out of said successively addressed buffer cores, each of said buffer cores further including a sense winding individual thereto, means including a readout winding common to all of said buffer cores for simultaneously reading data out of said buffer cores through said individual sense windings, and means for simultaneously reading data into said buffer cores through said individual sense windings.

11. The apparatus of claim 10 wherein said last-recited means includes means for activating said buffer inhibit winding concurrently with said individual sense windings.

12. The apparatus of claim 10 wherein each of said buffer cores requires a coercive force to switch from one of its stable states to the other which is twice that of said memory cores, said means for successively addressing said memory and buffer cores to read in data including means for applying half-select pulses to said memory cores, means for applying pulses of the same amplitude to said buffer cores, said coordinate and inhibit buffer core windings having twice the number of turns of the corresponding memory core windings, said means for simultaneously reading data out of said buffer cores comprising a buffer readout winding having twice the number of turns per buffer core as said inhibit winding, and means for applying pulses of the aforesaid amplitude to said readout winding.

13. The apparatus of claim 10 wherein each of said buffer cores requires a coercive force to switch from one of its stable states to the other which is *n* times that of each of said memory cores, where *n* is an integer greater than unity, said means for successively addressing said memory and buffer cores to read in data including means for applying pulses of substantially the same amplitude and duration to said cores, said coordinate and inhibit buffer core windings having *n* times the number of turns of the corresponding memory core windings.

14. The apparatus of claim 13 and further including a sense amplifier connected respectively to each of said memory sense windings and said common buffer sense winding, said last-recited windings having a turns ratio adapted to provide signals of substantially the same amplitude at the outputs of said connected sense amplifiers in response to core switching, a preamplifier connected to each of said individual buffer sense windings, each of said individual buffer sense windings having a relatively large number of turns with respect to said common buffer sense winding, said means for simultaneously reading data into said buffer cores through said individual buffer sense windings including means for concurrently energizing said preamplifiers and said buffer inhibit winding means.

15. Apparatus for verifying the storage of data characters in a storage medium selected from a recurring sequence of characters in accordance with input data characters received in coded form, comprising a bistable core memory having a plurality of different locations respectively adapted to store said coded input data characters, a bistable core buffer having a core corresponding to each of said different memory locations, coincident current means for successively addressing said different memory locations jointly with their corresponding buffer cores during a corresponding succession of address cycles, each address cycle including a readout and readin phase, first and second means for generating said recurring character sequence in said coded form out of phase with each other during a corresponding succession of character cycles, each of said character cycles including said succession of address cycles, means active during each address cycle for comparing the coded input data character of the memory location read out during said address cycle with the simultaneously generated pair of coded sequence characters, means responsive to said comparison with the leading coded sequence character then generated for storing operating data in the buffer core corresponding to the memory location read out during the same address cycle, said last-recited means including an inhibit winding common to said buffer cores, each of said buffer cores including a sense winding individual thereto, a separate preamplifier circuit connected to each of said individual sense windings, means connected to each of said preamplifiers for transferring a data character to said storage medium, means operative during the next character cycle and including a readout winding common to said buffer cores for simultaneously energizing said preamplifiers with the operating data contents of all of said buffer cores read out through said individual sense windings, each of said preamplifiers being adapted, upon being energized, to activate the connected data transfer means and to produce an echo signal, means for simultaneously reading the echo signal output of all of said preamplifiers into their corresponding buffer cores through said individual sense windings, means operative during each address cycle of the subsequent character cycle for reading out the echo signal contents of the then addressed buffer core prior to the reading of operating data into said core during the same address cycle, said last-recited means including a sense winding common to said buffer cores, and means for comparing the echo signal contents of said read out buffer core with the comparison results obtained during the same address cycle between said memory location contents and the lagging coded sequence character then generated.

16. The apparatus of claim 15 and further including means synchronized to said recurring character sequence for producing timing pulses, and means for actuating said first and second character sequence generating means with said timing pulses.

17. The apparatus of claim 16 and further including at least one bistable strobe core including an individual sense winding, coincident current means for selectively addressing said strobe core to switch it to one of its stable states, said readout winding linking said strobe core and being adapted to switch the latter to its other stable state to produce a pulse in said strobe core sense winding, an output strobe generator connected to said strobe core sense winding, said output strobe generator being responsive to each of said last-recited pulses to apply a first strobe pulse to each of said preamplifiers adapted to initiate said echo signals a predetermined time interval thereafter, and means for applying a second strobe pulse to each of said preamplifiers delayed from said first strobe pulse and adapted to terminate said echo signals.

18. The apparatus of claim 17 and further including an echo strobe generator connected to each of said preamplifiers, means for activating said echo strobe generator with said timing pulses, said echo strobe generator being responsive to said timing pulses to apply third strobe pulses to said preamplifiers adapted to read said echo signals into said buffer cores.

19. Apparatus for verifying the printing of data characters selected from a set of recurring characters in different line spaces on a paper web in accordance with input data character codes, comprising a bistable core memory having a plurality of locations respectively corresponding to said line spaces and adapted to store said input data character codes, a bistable core buffer having a plurality of cores corresponding respectively to said memory locations, circuit means including a preamplifier connected to a hammer driver corresponding to each of said line spaces, a print hammer connected to each of said hammer drivers adapted to print data characters on said web, means for simultaneously generating identical first and second code sequences of said set of recurring characters out of phase with each other by an integral number of character codes, each pair of said character codes being generated in one character cycle, means operative during a succession of address cycles in each character cycle for successively addressing all of said memory locations jointly with their corresponding buffer cores, means operative in each address cycle for comparing the contents read out of one memory location with the simultaneously occurring character code of said first sequence, means responsive to a true comparison obtained during the same address cycle for storing a print order in the buffer core which corresponds to said read out memory location, means operative during the next character cycle for simultaneously reading the print order contents of all of said buffer cores for the previously compared character into said preamplifier to energize said hammer drivers, each of said preamplifiers including means for generating an echo signal following the readin of a print order, means operative during the subsequent character cycle for simultaneously reading said echo signals from all of said preamplifiers into said buffer cores, means operative during said succession of address cycles in said subsequent character cycle for successively comparing the contents of said memory locations with the simultaneously occurring second sequence code for said previously compared character, and means operative during said subsequent character cycle for comparing the results of said last-recited comparison with the successively read out echo signal contents of said buffer corresponding to said previously compared character.

20. A magnetic storage device comprising a coordinate array of bistable cores, means including coordinate row and column windings for addressing individually selected ones of said cores, means including a sense winding common to said cores for reading out the contents of said individually addressed cores, means including an inhibit winding common to said cores for reading data into said individually addressed cores, a sense winding individual to each of said cores, means including a readout winding common to said cores for simultaneously reading out the contents of all of said cores through said individual sense windings, means including said individual sense windings for simultaneously reading data into said cores, at least one bistable strobe core including an individual sense winding, and a pair of coordinate row and column windings for addressing said strobe core to switch it to one of its stable states, said readout winding linking said strobe core and being adapted to induce a timing pulse in its sense winding upon switching said core to its other stable state.

References Cited by the Examiner

UNITED STATES PATENTS

| | | | |
|---|---|---|---|
| 3,049,692 | 8/1962 | Hunt | 340—146.1 |
| 3,093,818 | 7/1963 | Hunter | 340—174 |
| 3,193,802 | 7/1965 | Deerfield | 340—172.5 |
| 3,223,984 | 12/1965 | Bloch et al. | 340—174 |
| 3,246,292 | 4/1966 | Woo | 340—146.1 |

ROBERT C. BAILEY, *Primary Examiner.*

M. LISS, *Assistant Examiner.*